United States Patent
Karulin et al.

(10) Patent No.: US 12,046,057 B1
(45) Date of Patent: Jul. 23, 2024

(54) DEEP MACHINE LEARNING-ASSISTED DETECTION OF OBJECTS OF INTEREST FOR LIVE CELLS-BASED ASSAYS

(71) Applicant: CTL Analyzers LLC, Shaker Heights, OH (US)

(72) Inventors: Alexey Karulin, Solon, OH (US); Zoltán Megyesi, Kecskemet (HU); Melinda Katona, Szeged (HU)

(73) Assignee: CTL Analyzers LLC, Shaker Heights, OH (US)

( * ) Notice: Subject to any disclaimer, the term of this patent is extended or adjusted under 35 U.S.C. 154(b) by 0 days.

(21) Appl. No.: 18/142,780

(22) Filed: May 3, 2023

(51) Int. Cl.
*G06V 20/69* (2022.01)
*G06V 10/774* (2022.01)
*G06V 10/82* (2022.01)

(52) U.S. Cl.
CPC .......... *G06V 20/698* (2022.01); *G06V 10/774* (2022.01); *G06V 10/82* (2022.01)

(58) Field of Classification Search
CPC ......... G06T 7/0012; G06T 2207/10056; G06T 2207/30072; G01N 21/6428; G01N 33/6863; G06V 20/69
See application file for complete search history.

(56) References Cited

U.S. PATENT DOCUMENTS

| | | |
|---|---|---|
| 6,410,252 B1 | 6/2002 | Lehmann et al. |
| 2012/0076408 A1* | 3/2012 | Suk ........................ G06V 10/50 |
| | | 382/173 |
| 2014/0029052 A1* | 1/2014 | Polit ...................... G06K 15/00 |
| | | 358/1.15 |
| 2020/0116636 A1* | 4/2020 | Smedman .......... G01N 21/6428 |
| 2022/0261990 A1* | 8/2022 | Goldberg ............... G06N 20/00 |

OTHER PUBLICATIONS

J. Ker, L. Wang, J. Rao and T. Lim, "Deep Learning Applications in Medical Image Analysis," in IEEE Access, vol. 6, pp. 9375-9389, 2018, doi: 10.1109/ACCESS.2017.2788044. (Year: 2018).*
Megyesi, et al., "Multi-Color FLUOROSPOT Counting Using ImmunoSpot® Fluoro-X™ Suite," Handbook of ELISPOT: Methods and Protocols, Methods in Molecular Biology, vol. 1808, Springer 2018.

(Continued)

*Primary Examiner* — Ross Varndell
(74) *Attorney, Agent, or Firm* — David H. Judson

(57) ABSTRACT

A method, apparatus and computer program product to provide machine learning-assisted detection of objects of interest in live cell-based assays, where the objects of interest are larger than cells used in the assay. The technique herein comprises receiving image data that has been captured from a set of imaging devices, such as immune monitoring analyzer machines. Representative image data is an enzyme-linked immune absorbent spot (ELISPOT) assay captured from an ELISPOT analyzer. For each set of image data, the image data is then processed using, for example, one of: (a) a first pre-trained model; and (b) a set of one or more detection algorithms, to generate training data comprising a set of labels for the image data. A model, e.g., a deep neural network (DNN), is then trained using the set of labels. Following training, the model is provided for detection of the objects of interest.

16 Claims, 3 Drawing Sheets

(56) References Cited

OTHER PUBLICATIONS

Karulin, et al., "Multiplexing T- and B-Cell FLUOROSPOT Assays: Experimental Validation of the Multi-Color ImmunoSpot® Software Based on Center of Mass Distance Algorithm," Handbook of ELISPOT: Methods and Protocols, Methods in Molecular Biology, vol. 1808, Springer 2018.
Janetzki, et al, "Stepping up ELISpot: Multi-Level Analysis in FluoroSpot Assays," Cells 2014, 3, 1102-1115; doi:10.3390/cells3041102.
Dillenbeck, et al., "Triple Cytokine FluoroSpot Analysis of Human Antigen-Specific IFN-γ, IL-17A and IL-22 Responses," Cells 2014, 3, 1116-1130; doi: 10.3390/cells3041116.
Rebhahn, et al., "Automated analysis of two- and three-color fluorescent Elispot (Fluorospot) assays for cytokine secretion," Comput Methods Programs Biomed. Oct. 2008 ; 92(1): 54-65. doi:10.1016/j.cmpb.2008.06.002.
Brugger, et al., "Automated Counting of Bacterial Colony Forming Units on Agar Plates," PLoS ONE, vol. 7, Issue 3, Mar. 2012.
Rebhahn, et al., "Automated analysis of two- and three-color fluorescent Elispot (Fluorospot) assays for cytokine secretion," Computer Methods and Programs in Biomedicine 92 (2008) 54-65.
Katzelnick, et al., "Viridot: An automated virus plaque (immunofocus) counter for the measurement of serological neutralizing responses with application to dengue virus,".
Nazlibilek, et al., "Automatic segmentation, counting, size determination and classification of white blood cells," Measurement, vol. 55, Sep. 2014, pp. 58-65.
Sadanandan, et al., "Automated Training of Deep Convolutional Neural Networks for Cell Segmentation," Sci Rep 7, 7860 (2017).
Al-Kofahi, et al., "A deep learning-based algorithm for 2-D cell segmentation in microscopy images," BMC Bioinformatics 19, 365 (2018).
Arbelle, et al., "Microscopy Cell Segmentation Via Convolutional LSTM Networks," arXiv:1805.11247v2 [cs.CV] Jan. 6, 2019.
Scherr, et al., "Cell segmentation and tracking using CNN-based distance predictions and a graph-based matching strategy," PLOS ONE | https://doi.org/10.1371/journal.pone.0243219 Dec. 8, 2020.
Fujita, et al., "Cell Detection and Segmentation in Microscopy Images with Improved Mask R-CNN," ACCV, 2020.
Dawoud, et al., "Few-Shot Microscopy Image Cell Segmentation," arXiv:2007.01671v1 [cs.CV] Jun. 29, 2020.
Greenwald, et al., "Whole-cell segmentation of tissue images with human-level performance using large-scale data annotation and deep learning," Nat Biotechnol. Apr. 2022 ; 40(4): 555-565. doi: 10.1038/s41587-021-01094-0.
Van den Broek, et al., "Cellpose: deep learning-based, generic cell segmentation," https://analyticalscience.wiley.com/do/10.1002/was.0004000208, Nov. 2021.
Chen, et al., "Evaluation of cell segmentation methods without reference segmentations," https://www.biorxiv.org/content/10.1101/2021.09.17.460800v2.full.pdf, Dec. 2021.
Din, et al., "Unsupervised deep learning method for cell segmentation," May 2021 https://doi.org/10.1101/2021.05.17.444529.
Panigrahi, et al., "Misic, a general deep learning-based method for the high-throughput cell segmentation of complex bacterial communitie," eLife, https://doi.org/10.7554/eLife.65151, Sep. 2021.
Wagner, et al., "EfficientCellSeg: Efficient Volumetric Cell Segmentation Using Context Aware Pseudocoloring," arXiv:2204.03014v2 [eess.IV] Nov. 28, 2022.

\* cited by examiner

DEEP MACHINE LEARNING-ASSISTED DETECTION OF OBJECTS OF INTEREST FOR LIVE CELLS-BASED ASSAYS

BACKGROUND

Technical Field

This application relates generally to immune monitoring tools and, in particular, to the use of advanced machine learning to provide improved operating results for users of these tools.

Brief Description of the Related Art

The immune system plays a critical role in defending against infectious agents, as well as in the development of many diseases, including cancer and autoimmune disorders. Immune monitoring refers to the measurement and analysis of various aspects of the immune system, including the levels of specific immune cells, the production of cytokines and other immune molecules, and the ability of the immune system to mount an effective response against a particular pathogen or antigen. Several methods involving live cell-based assays have been developed to measure these parameters; these include ELISPOT, FLUOROSPOT, and viral plaque neutralization assays.

The ELISPOT assay is a sensitive and specific method for the detection of individual cells that produce a specific cytokine or other immune molecules (analytes). FLUOROSPOT is a modification of the ELISPOT assay that utilizes fluorescent detection. In these assays, cells are plated onto a membrane coated with a capture antibody or other molecules specific for the secreted analyte. After incubation, the cells are removed and the captured around the cells analyte is detected using a detection antibody (or other specific reagent) and a colorimetric or fluorescent substrate/label. The number of analyte-producing cells and the amount of secreted analyte per cell can be quantified by analyzing spots on the membrane. This assay has been used in a wide variety of applications, including the evaluation of vaccine efficacy, the monitoring of disease progression, and the assessment of immune responses to various pathogens.

The viral plaque neutralization assay is a widely used family of methods for the evaluation of the ability of antibodies to neutralize viral particles. In this assay, serial dilutions of a test sample containing antibodies are incubated with a virus, and the mixture is plated on a cell monolayer. After incubation, the cells are fixed and stained, and plaques (areas of lysed cells) or areas stained with anti-viral antibodies formed by the virus are counted. The neutralizing activity of the antibodies is determined by comparing the number of plaques formed in the presence of the test sample with that of a control sample lacking antibodies. This assay has been used in the development and evaluation of vaccines, antiviral drugs, and monoclonal antibodies against viral infections.

In ELISPOT/FLUOROSPOT assays, the analyte footprints of individual antigen-specific T or B cells, and the resulting enzyme-linked immune absorbent spots (ELISPOTs), vary significantly in both size and intensity. This wide range of naturally occurring spot sizes in an assay (with samples collected from peripheral blood mononuclear cells (PBMC)) complicates the distinction of true signal (spots) generated by single antigen-stimulated immune cells versus the background noise (analyte secreted by non-specific T and B cells or cells of the innate immune system). Another level of complexity is related to clusters of closely situated cells. To address this problem, and to provide objective, scientifically-validated data analysis, immune monitoring systems have been developed. One such commercial system is ImmunoSpot®, available from Cellular Technology Limited (CTL). This system comprises an analyzer for high throughput imaging and data analysis of ELISPOT, FLUOROSPOT, viral plaque (and other) assays. An associated suite of software provides validated counting algorithms that are simple to use and that produce highly-accurate results. Among other things, Immunospot® software automatically counts individual spots and estimates the number of average sized individual spots required to form an oversized cluster in question (in an assay), and the calculated number is included in the count for that well. The software also automatically establishes spot size and spot density distributions for both medium background (negative control) and antigen test wells, relying on conventional parametric image analysis algorithms to guide the statistical analysis for determining the minimum and maximum spot size and spot densities. In this way, ImmunoSpot® provides objective, scientifically-validated analysis of ELISPOT assays. The analyzer may also be used for other immune monitoring assays, such as multi-color FLUOROSPOT and different variants of the viral plaque assay.

While existing data analysis techniques such as described above provide significant advantages and are widely accepted, it is desirable to provide more efficient, enhanced techniques that can benefit users of these analyzer tools and their associated biological detection systems.

BRIEF SUMMARY

To that end, the approach herein provides for an objective, non-parametric, user-independent deep machine learning-based data analysis method. As will be seen, the method is independent on operational variations between different instruments and practiced laboratory techniques.

A method, apparatus and computer program product to provide machine learning-assisted detection of objects of interest in live cell-based assays, where the objects of interest are larger than cells used in the assay. In a representative embodiment, the technique herein comprises receiving image data that has been captured from two or more imaging devices, such as immune monitoring analyzer machines. The imaging devices may vary, e.g., imaging devices of different type, imaging devices of a same type and having distinct configurations, and the like. Representative image data is an enzyme-linked immune absorbent spot (ELISPOT) assay that has been captured from an ELISPOT analyzer. For each set of image data, the image data is then processed, e.g., using one of: (a) a first pre-trained model; and (b) a set of one or more detection algorithms, to generate training data comprising a set of labels for the image data. Labels can be outlines or centers of objects. A model, e.g., a deep neural network (DNN), is then trained using the set of labels for the image data. Following training, the model is provided for detection of the objects of interest. Typically, the image data is received from multiple distinct entities, and the set of two or more imaging devices include a first imaging device of a first entity, and a second imaging device of a second entity; the first and second entities may be the same entity, or entities that are distinct from one another. The above-described method may involve two or more imaging devices from a single entity. In a preferred embodiment, the technique is implemented in software and in provided "as-a-service" by a service provider that is distinct from the entities.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
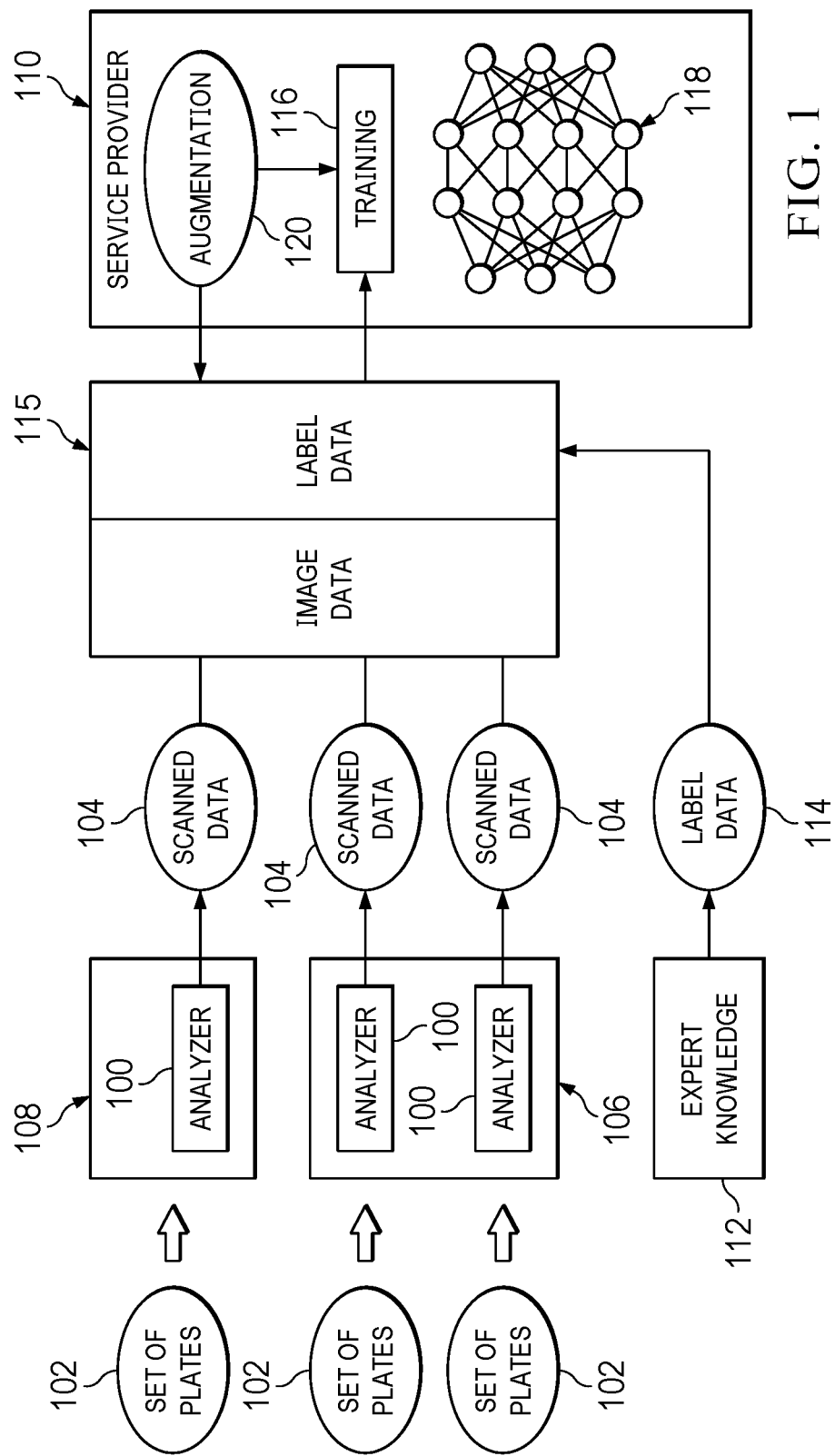
FIG. 1 depicts a representative operating environment in which the techniques of this disclosure are practiced.

The techniques herein typically are implemented in association with immune monitoring analyzer machines, such as the CTL ImmunoSpot® system. The identification of this commercial system is not intended to be limited, as the approach here may be utilized with respect to machines produced by other manufacturers and suppliers. As depicted in FIG. 1, there are a plurality of such machines, each identified as analyzer 100. In a well-known manner, each analyzer 100 receives a set of one or more plates 102, and processes those plates to produce scanned data 104. Each analyzer may receive a separate set (as shown) or the same set of plates. The plates comprise assays, such as single color ELISPOT, double color ELISPOT, single- or multi-color FluoroSpot, BioSpot, viral plaque, colony counting, and many more. In a representative embodiment, the assays are live cells-based assays, and the analyzer is configured to detect objects of interest in these assays. In a preferred embodiment, the objects of interest in the image are larger than cells used in the assay, and thus representative objects are cell clusters or colonies, cell-secreted products captured on the surface around the cells, stained or lysed areas in monolayers of cells, micro particles, or other artifacts consisting of multiple cells or that result from individual cell functions. Typically, the analyzer machines 100 are machines of the same type, although one or more the machines may have different configurations from one another. In addition, one or more machines may produce varying outputs (event with respect to images derived from the same set of plates 102) due to variations in various operating characteristics of camera and other components used in the machines. This variations may be due to differing components or their operational characteristics, age/usage, local operating conditions, operator configuration or use error, inconsistent user maintenance, different software patch histories, and the like, and such variations may be reflected in different operating parameters across the devices and, as a consequence, differences in the associated image properties produced by those machines. These image properties include, for example, one of: orientation, position, brightness, contrast, gamma, zoom factor, focus precision and color. The difference in quality of objects resulting from varying test samples (tested individuals) or experimental assay conditions (reagents, time, environmental conditions, and lab personnel qualification).

According to this disclosure, a technique is described that addresses the existence of such assay-specific machine-specific and/or scanned data variations (whatever their proximate cause) to provide a machine learning-assisted solution that ensures that analyzer users are assured that their machines obtain consistent and accurate results over their lifecycle without need to adjust counting parameters. As will be seen, this result is enabled in an operating environment such as depicted in FIG. 1, preferably using deep machine learning-assisted detection of objects of interest for live cell-based assays using a machine learning model that has been trained centrally by a service provider and then shared for use in association with the respective analyzers 100. Thus, in a typical but non-limiting scenario, the analyzers 100 depicted in FIG. 1 are operated by one or more entities (e.g. laboratories, hospitals, private clinics, or the like). For example, a single entity may operate all of the analyzers 100. Or, there may be multiple distinct entities each operating one or more analyzers of the same type. Generalizing, in a typical but non-limiting scenario there are two or more analyzers of the same type, and a first of these machines is managed and operated by a first entity (e.g., entity 106), and a second of these machines is managed and operated by a second entity (e.g., entity 108), where the first and second entities are distinct from one another. As used herein, first and second entities may be associated with a single enterprise but have analyzers in different locations. The notion here is that there are multiple analyzers, typically of the same type, but where such analyzers produce different sets of scanned results for one or more reasons, and it is desired to provide for improved operating consistency of those machines even as they are used by different entities (or different users at a particular entity). The approach may also be used for different entities that have analyzers of different types from different manufacturers.

In this context, and as will be described in more detail below, preferably this solution is enabled by a service provider 110 that is distinct from the entities themselves, although this too is not a requirement. A representative service provider is the manufacturer or distributor of the analyzer machines, although this is not a limitation. As will be described, the service provider utilizes advanced machine learning techniques that are enabled by the service provider combining different sets of training data (from multiple machines associated with one or more entities) to produce user independent "meta" machine learning models, or entity-specific models, based on specific sets of data from these entities. The service provider then itself uses these models and shares them back to the one or more entities. The notion of sharing may include pre-installing these models (or any of them) on new analyzers that are provided to entities. As will be described, a model provides enhanced and consistent operation of the analyzers across machine types, configurations and users, and it also accounts for varying assay conditions In a preferred embodiment, the technique is implemented in software and are provided "as-a-service" by the service provider 110 that is distinct from the entities.

Returning to FIG. 1, an entity may have the capability of using expert knowledge 112 to provide label data 114 with respect to the scanned data 104 produced by its associated analyzer. Together, label data and image data comprise training data 115. The expert knowledge may be provided by a pre-trained machine learning model natively associated with an analyzer, by a pre-trained meta model, by manual labeling by a human being, by counting algorithm-based software, or otherwise available to the entity. Expert knowledge and counting/labeling may be provided or supplemented by the service provider. As depicted in FIG. 1, and as will be explained in further detail below, the scanned data 104 and the associated label data 114 are used by the service provider 110 for training 116 of the deep neural network (DNN) 118. The DNN may also leverage data produced by an augmentation function 120. Data augmentation is a process of artificially increasing the amount of data by generating new data points from existing data. It may involve adding minor alterations to data or using machine learning models to generate new data points in the latent space of the original data to thereby amplify the dataset. The augmentation function 120 enables augmentation of the scanned (image) data, e.g., using historical data associated with a given one of the set of analyzers, to generate a set of augmented image data that is then used to facilitate the training 116.

Typically, the scanned data are images (image data) derived from an assay, such as enzyme-linked immune absorbent spot (ELISPOT) assay, a FLUOROSPOT assay, a viral plaque assay, a CRISPR-based DNA assay, and a cellular colony counting assay. The cellular colony typically may vary by type, e.g., bacterial, yeast or stem cells. All of these techniques use cells on a flat surface. In the ELISPOT and FLUORSPOT method, footprints of cell-secreted products are detected using surface bound capture reagents specific for the analyte. In viral plaque assays, areas in the monolayers of cells infected by a virus are detected. In CRISPR-based assays, fluorochrome-stained DNA micro particles are detected. In colony counting assays, the colonies of cells growing on the solid substrate surface (bacteria, yeast, stem cells, etc.) are detected. In all of these methods, the objects of interest are larger than a cell. Further, it should be appreciated that the techniques here are not limited to advanced immune monitoring tools, such as CTL Immuno-Spot®. As used herein, an in addition to an ELISPOT or FLUOROSPOT (or the like) analyzer, an imaging device may include other types of imaging systems that may be configured for this purpose, e.g., a microscope with digital camera, a digital camera with micro- or macro-zoom or fixed lens, a flatbed scanner, or even a smartphone or tablet configured with imaging software.

Figure 2:
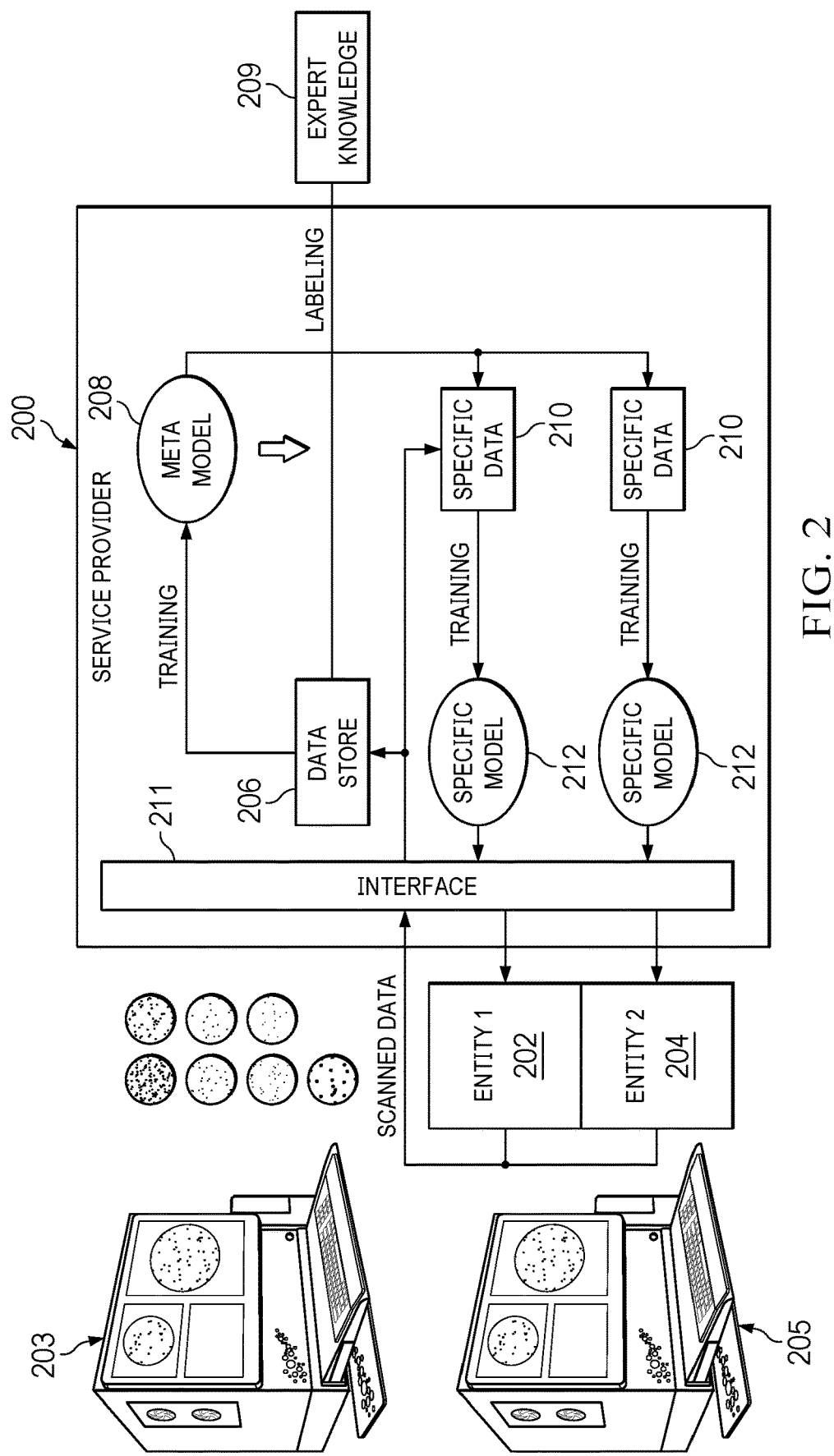
FIG. 2 depicts a preferred operating scenario of this disclosure wherein a service provider received imaging data from multiple sources (e.g., different entities running the same model analyzer) and uses that imaging data to facilitate training of a deep neural network that is then used to create entity independent, entity- or machine-specific models.

FIG. 2 depicts the technique of this disclosure in additional detail. In this example embodiment, the service provider is represented as reference 200, and there are first and second entities 202 and 204. The notion of an "entity" is not intended to be limiting, as the term may refer to an enterprise, an enterprise department, an enterprise location, or some other such designation. Entity 202 operates a first analyzer 203, and entity 204 operates a second analyzer 205. Analyzers 203 and 205 are assumed to be of the same type, but they may have varying operating configurations or conditions for one or more reasons, as described above. In operation, the service provider 200 establishes the connection with entities via an entity-to-provider interface 211, which may be an application, web service, cloud service, application programming interface (API), email, file share, or the like. The service provider receives image data that has been captured from a set of two or more imaging devices, such as immune monitoring analyzer machines 203 and/or 205. As noted above, the imaging devices may be imaging devices of a same type. Representative image data is an enzyme-linked immune absorbent spot (ELISPOT) assay that has been captured from an ELISPOT analyzer. The received image data is stored in a provider data store 206 (a file system, a data container, a database, or the like) and preferably is used for training both entity-specific and entity-independent deep neural networks (respectively, models 212 and 208). Expert knowledge 209 (e.g., as provided by the entities and/or the service provider) may also be used to facilitate training of the meta-model. Following training, in this embodiment the meta model is used to label data 210 specific to a particular entity and to train entity-specific model 212. Meta model 208 may be used, e.g., via transfer learning, to facilitate generation of an entity-specific model 212 for a particular entity or for use in association with the analyzer associated with a particular entity. When provided, the entity-specific model 212 is used for actual inferencing on the entity's image data going forward (or until a further or next update to the model). Typically, the above-described training process including, without limitation, receiving additional data and retraining of the models 208 and/or 212, is iterative.

In a preferred embodiment the meta-model is used by a set of entities that benefit from the approach, although one or more entities preferably also each obtains an entity-specific model that, in effect, is at least in part customized by the entity's data set, namely, the imaging data produced by that entity's analyzer. In this manner, the solution facilitates the service provider's training of a neural network model that represents a multi-entity aggregation (or harmonization) of data sets across a set of analyzer machines, typically operated by multiple distinct entities.

Figure 3:
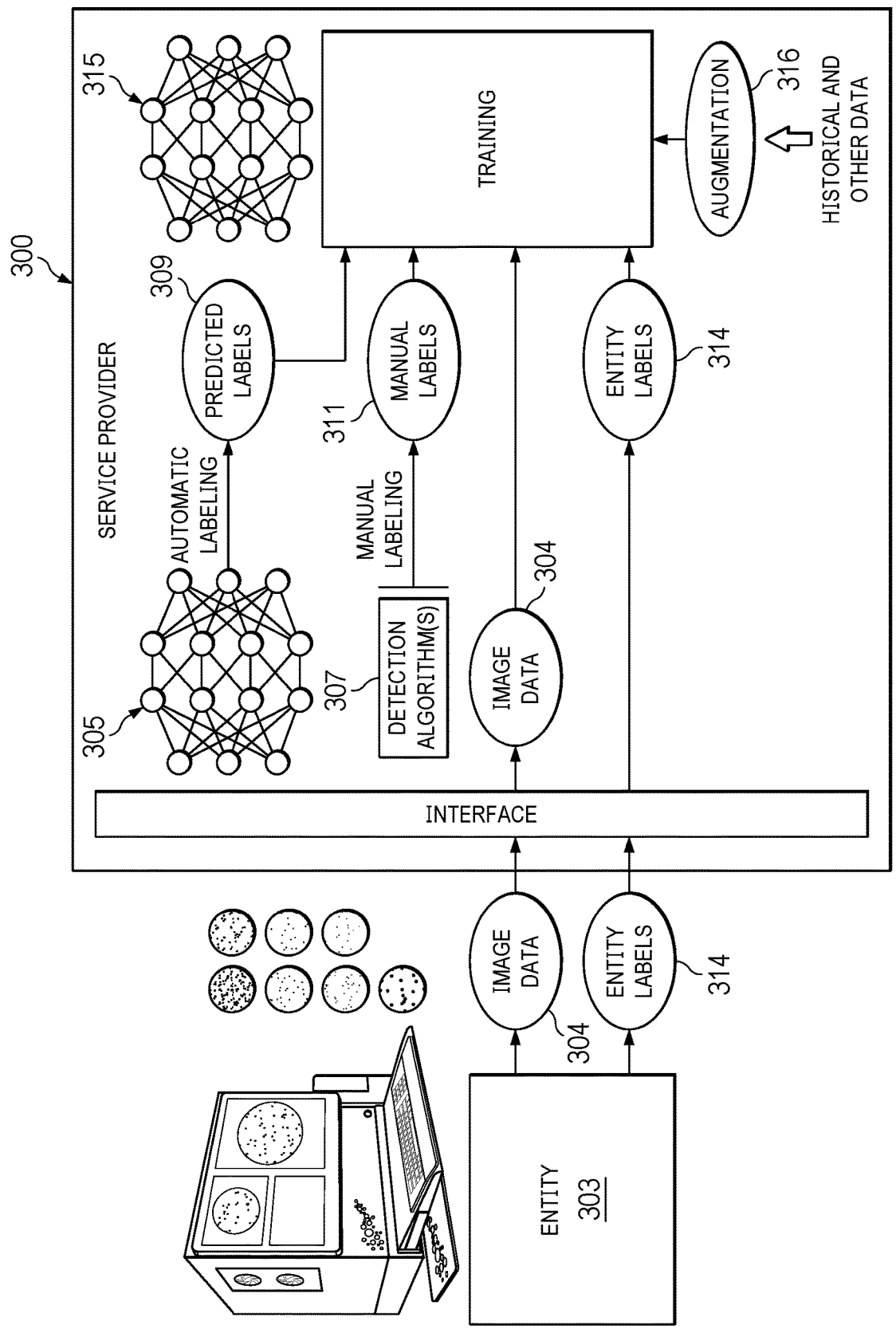
FIG. 3 depicts a training workflow for the neural network model in a representative implementation.

FIG. 3 depicts a training operation for the neural network model in additional detail, and with respect to a typical embodiment. In this example, the service provider 300 is shown as receiving image data 304 and entity-supplied labels 314 from the entity 303. As noted above, labeling also may be supplemented or done by the service provider. As noted above, service provider typically receives similar data sets from other entities (not shown). As depicted, preferably the image data 304 is then processed using one of: (a) a first pre-trained model 305; and (b) a set of one or more detection algorithms 307, to generate training data comprising a set of labels for the image data. In an example embodiment, the pre-trained model 305 is a Convolutional Neural Network (ConvNet/CNN), which is a deep learning algorithm that takes an input image, assigns importance (learnable weights and biases) to various aspects/objects in the image, and differentiates one from the other. As depicted, in this example embodiment the set of labels comprises labels 309 predicted by the pretrained model 305, labels 311 that are associated (e.g., by some automated means, or manually) with the outputs generated by the detection algorithms 307, as well as the entity-supplied labels 314 and optionally any service provider-supplied labels. The detection algorithms typically are probabilistic or deterministic counting techniques and, as noted above, the customer labels typically are supplied by some entity-based expert knowledge. It is not required that each of the label types (namely, labels, 309, 311 and 314) be used, although it is desirable to use all of the available label types (and labels) for the neural network training, as each label type represents a different view (label-wise) of the same image data 304. Using the received image data and these various label(s), the neural network 315 is then trained on this training data, as well as augmentation data supplied by the augmentation function 316, as previously described. In particular, the training preferably includes augmenting at least some of the image data that is received from the entity based on historical data associated with a given one of the set of imaging devices (typically the ones used by the entity) to generate a set of augmented image data, and then using the set of augmented image data in the training. Preferably, augmentation typically is based on one of: information about at least one operating parameter of the given imaging device, and image properties that are one of: orientation, position, brightness, contrast, gamma, zoom factor, focus precision and color. As noted above, data augmentation encompasses different types of techniques that enhance the size and quality of training datasets such that better deep learning models can be built. In an example embodiment, the image augmentation algorithms include geometric transformations, color space augmentations, kernel filters, mixing images, random erasing, feature space augmentation, adversarial training, generative adversarial networks, neural-style transfer, and meta-learning.

As also noted, after the meta-model is trained in this manner, the model is then used by the service provider for subsequent inferencing. In the alternative, and in a scenario where the meta-model may not provide sufficiently-accurate inferencing results, an entity-specific model is provided back to the customer 303 for subsequent use in association with the entity's analyzer machine. In the latter case, and as was depicted in FIG. 2, the model provided to the entity is customized for the entity and the entity's specific imaging machine.

The nature of the image capture provided by a given imaging device is not intended to be limited. With respect to a given assay, image capture may involve one or more images, color/grayscale, and in any format (e.g., RGB, raw). Further, the method of analysis used in the imaging device may vary. In a typical use case, the analyzer performs the following operations on the image data: pre-processing (e.g., cropping, gray converse, convolutions, color modification, zooming, inversion, or the like), connected component analysis (for detecting the object), and then post-processing.

In one embodiment, the meta-model is also a type of Convolutional Neural Network. Conventionally, CNNs are very efficient at identifying what is present in an image For segmentation, CNNs also need to learn to position image constituents with precision. Without intending to be limiting, a CNN architecture that may be used here is based on U-Net, which is a network that consists of a contracting path (encoder) and an expansive path (decoder), thereby giving the network u-shaped architecture. More specifically, for each encoder block, U-Net also has a conjugate decoder block. To enhance their learning and to ensure that pixels are positioned correctly in the final output, decoders seek help (in the form of skip connections) from their corresponding encoders. More generally, the contracting path is a typical convolutional network that consists of repeated application of convolutions, each followed by a rectified linear unit (ReLU) and a max pooling operation. During the contraction, spatial information is reduced while feature information is increased. The expansive pathway combines the feature and spatial information through a sequence of up-convolutions and concatenations with high-resolution features from the contracting path. The meta-model may be trained by assigning a data-augmented image as the training input, together with one or more augmented labels that describe the properties of the detected objects that are desired to be learned for subsequent inferencing. The training data may be provided in batches, and multiple training epochs may be used. The training error is back-propagated using a loss function. The image and label augmentation are selected based on the dataset content, and preferably training results are evaluated after each training epoch and compared to training labels using one or more metrics to indicate the progress of the training. After each epoch, it may be desirable to use a separate validation set to test the effectiveness of the training.

The network is executed on processing units, such as a set of Graphics Processing Units (GPUs).

As noted above, the techniques described above have particular efficacy for machine learning-assisted detection of objects of interest, where the objects of interest are larger than cells used in the assay. In a variant embodiment, the technique may leverage additional neural network-based discrimination. For example, within a particular assay objects of interest may be situated close to each other, such that they cannot be resolved or could be partially or even totally obscured by other structures, such as tears in the underlying surface (membrane) or non-specific background surface staining thus making it difficult for the meta model or for the entity-specific model to provide desired results. In such circumstance, it may be desired to augment the subject technique with an additional neural network that is trained to identify such obstructed images. An example embodiment comprises another U-Net network that has learned how to detect images containing confluent, closely situated objects; the output of this network is a binary decision to ether use the image as an input for the U-Net network described above or to reject it.

Enabling Technologies

Typically, the computing platform is managed and operated "as-a-service" by a service provider entity. In one embodiment, the platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid.

The system may be implemented on-premises (e.g., in an enterprise network), in a cloud computing environment, or in a hybrid infrastructure. An individual end user typically accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront. The platform may be managed and operated by a service provider. Although typically the platform is network-accessible, e.g., via the publicly-routed Internet, the computing system may be implemented in a standalone or on-premises manner. In addition, one or more of the identified components may interoperate with some other enterprise computing system or application.

Preferably, the platform supports a machine learning system. The nature and type of Machine Learning (ML) algorithms that are used may vary. As is known, ML algorithms iteratively learn from the data, thus allowing the system to find hidden insights without being explicitly programmed where to look. ML tasks are typically classified into various categories depending on the nature of the learning signal or feedback available to a learning system, namely supervised learning, unsupervised learning, and reinforcement learning. In supervised learning, the algorithm trains on labeled historic data and learns general rules that map input to output/target. The discovery of relationships between the input variables and the label/target variable in supervised learning is done with a training set, and the system learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, linear regression, logistic regression, naive Bayes, and neural networks.

Deep learning is a subfield of machine learning that focuses on the development of multi-layered artificial neural networks. As has been described above, the techniques herein preferably leverage deep learning. Formally, a Neural Network (NN) is a function g: X→Y, where X is an input space, and Y is an output space representing a categorical set in a classification setting (or a real number in a regression setting). For a sample x that is an element of X, $g(x)=f_L(f_{L-1}(\ldots((f_1(x))))$. Each $f_i$ represents a layer, and $f_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

Thus, for example, in one embodiment, and without limitation, a neural network such as described is used to extract features from an utterance, with those extracted features then being used to train a Support Vector Machine (SVM).

Formally, "unsupervised learning" is a problem in machine learning that asks how to learn patterns from unlabeled data. Clustering is a classic unsupervised learning problem. Unsupervised learning is often formulated as a generative modeling problem, where data is viewed as being generated from some unobserved latent variable(s) that are inferred jointly with the parameters of the model. Generalizing, in unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

The following provides additional details regarding supervised machine learning. Formally, "supervised learning" is a problem in machine learning, in particular, how to learn a function to predict a target variable, usually denoted y, given an observed one, usually denoted x, from a set of known x, y pairs. Generalizing, supervised learning is the machine learning task of inferring a function from labeled training data. The training data consist of a set of training examples. In supervised learning, typically each example is a pair consisting of an input object (typically a vector), and a desired output value (also called the supervisory signal). A supervised learning algorithm analyzes the training data and produces an inferred function, which can be used for mapping new examples. An optimal scenario allows for the algorithm to correctly determine the class labels for unseen instances. This requires the learning algorithm to generalize reasonably from the training data to unseen situations.

For supervised learning, the following steps are used. An initial determination is what kind of data is to be used as a training set. The training set is then gathered. In particular, a set of input objects is gathered and corresponding outputs are also gathered, either from human experts or from measurements. In a typical example, 1,000-10,000 images are used for this purpose. Then, an input feature representation of the learned function is determined. In this approach, typically the input object is transformed into a feature vector, which contains a number of features that are descriptive of the object. The structure of the learned function and corresponding learning algorithm are then determined. For example, support vector machines or decision trees may be used. The learning algorithm is then run on the gathered training set. Some supervised learning algorithms require a user to determine certain control parameters. These parameters may be adjusted by optimizing performance on a subset (called a validation set) of the training set, or via cross-validation. The accuracy of the learned function is then evaluated. After parameter adjustment and learning, the performance of the resulting function is measured on a test set that is separate from the training set.

As noted above, the technique herein may leverage transfer learning to adapt the neural network to entity-specific models. Transfer learning is a type of machine learning problem, in particular, how to take knowledge learned from one task and apply it to solve another related task. When the tasks are different but related, representations learned on one task can be applied to the other.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Other enabling technologies for the machine learning algorithms include, without limitation, vector autoregressive modeling (e.g., Autoregressive Integrated Moving Average (ARIMA)), state space modeling (e.g., using a Kalman filter), a Hidden Markov Model (HMM), recurrent neural network (RNN) modeling, RNN with long short-term memory (LSTM), Random Forests, Generalized Linear Models, Extreme Gradient Boosting, Extreme Random Trees, and others. By applying these modeling techniques, new types of features are extracted, e.g., as follows: model parameters (e.g. coefficients for dynamics, noise variance, etc.), latent states, and predicted values for a next couple of observation periods.

Typically, but without limitation, a client device is a mobile device, such as a smartphone, tablet, or wearable computing device, laptop or desktop. A typical mobile device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Preferably, each above-described process is implemented in computer software as a set of program instructions executable in one or more processors, as a special-purpose machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics. There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

The techniques herein generally provide for the above-described improvements to a technology or technical field, as well as the specific technological improvements to various fields, all as described above.

The above-described solution may be implemented across various use cases. As a variant to the above-described use case, another use case may involve a service workflow wherein the service provider performs a demonstration of the imaging capabilities of a machine on the entity's assays and collected sample data that is used by the service provider to create a demonstration model. This workflow enables the customer to see the operation of the analyzer and confirm that the machine meets its technical requirements. The analyzer can also be used in test experiments to generate experiment data that may also be used by the service provider to provide custom training to the model (i.e., training specific to the customer), and the resulting trained model can then be provided back to the entity for further use (e.g., other experiments). This process may be carried out iteratively. Once the customer is satisfied with the solution, the service provider provides the multi-entity generated modeling solution previously described.

What is claimed is as follows:

1. A method for machine learning-assisted detection of objects of interest in live cell-based assays, where the objects of interest are footprints formed by analyte secretion or release by cells in an assay, comprising:
   receiving image data of objects of interest that has been captured from two or more imaging devices, wherein at least one imaging device is an automated visible light-based or fluorescence-based image device that captures the image data;
   processing the image data using at least one of: (a) a first pre-trained model; and (b) a set of one or more detection algorithms, to generate training data comprising a set of labels for the image data;

training a model using the set of labels for the image data, wherein the model is a neural network; and following training, transferring the model to one or more end users for detection of the objects of interest;

wherein for given image data received from one of the imaging devices, determining whether the given image data should be processed to generate the training data, wherein a determination is based on applying the given image data to a second model that has been trained to discriminate objects that are situated in confluent association with objects of interest or that are obscured by other structures.

2. The method as described in claim 1 wherein the image data is derived from one of: an enzyme-linked immune absorbent spot (ELISPOT) assay, and a FLUOROSPOT assay.

3. The method as described in claim 1 wherein the at least one imaging device is one of: an ELISPOT analyzer, and a FLUOROSPOT analyzer.

4. The method as described in claim 1 wherein the image data is received from one or more entities.

5. The method as described in claim 4 wherein the one or more entities include a first entity, and further including receiving from the first entity a set of first entity labels for the image data associated with the first entity, and using the first entity labels in the model training.

6. The method as described in claim 4 wherein the method is provided as software-as-a-service by an operating entity that is distinct from the one or more entities.

7. The method as described in claim 1 wherein the set of two or more imaging devices include at least a first imaging device of a first entity, and a second imaging device of a second entity, the first and second entities being a same entity, or distinct from one another.

8. The method as described in claim 1 wherein the set of two or more imaging devices include at least a first imaging device of a first entity, and a second imaging device of the first entity, the first and second imaging devices differing from one another in at least one operating characteristic.

9. The method as described in claim 8 wherein augmentation is based on one of: information about at least one operating parameter of the given imaging device, and image properties that are one of: orientation, position, brightness, contrast, gamma, zoom factor, focus precision and color.

10. The method as described in claim 1 wherein the provided model is one of: an entity-independent model, and an entity-specific model.

11. The method as described in claim 1 wherein the training further includes augmenting at least some of the image data based on historical data associated with a given one of the set of imaging devices to generate a set of augmented image data, and using the set of augmented image data in the training.

12. The method as described in claim 11 wherein the deep neural network is an encoder-decoder based neural network.

13. The method as described in claim 1 wherein the set of two or more image devices includes imaging devices of a same type.

14. The method as described in claim 1 wherein the set of two or more imaging devices includes first and second imaging devices of a same type and with distinct configurations.

15. An apparatus, comprising:
one or more hardware processors; and
computer memory holding computer program code executed by the one or more hardware processors to provide machine learning-assisted detection of objects of interest in live cell-based assays, where the objects of interest are footprints formed by analyte secretion or release by cells, the computer program code configured to:
receive image data of objects of interest that has been captured from two or more imaging devices, wherein at least one imaging device is an automated visible light-based or fluorescence-based image device that captures the image data;
process the image data using at least one of: (a) a first pre-trained model; and (b) a set of one or more detection algorithms, to generate training data comprising a set of labels for the image data;
train a model using the set of labels for the image data, wherein the model is a neural network; and
following training, transfer the model to one or more end users for detection of the objects of interest;
wherein for given image data received from one of the imaging devices, the computer program code is further configured to determine whether the given image data should be processed to generate the training data, wherein a determination is based on applying the given image data to a second model that has been trained to discriminate objects that are situated in confluent association with objects of interest or that are obscured by other structures.

16. A computer program product comprising a non-transitory computer-readable medium holding computer program code executable by a hardware processor to provide machine learning-assisted detection of objects of interest in live cell-based assays, where the objects of interest are footprints formed by analyte secretion or release by cells in an assay, the computer program code configured to:
receive image data of objects of interest that has been captured from two or more imaging devices, wherein at least one imaging device is an automated visible light-based or fluorescence-based image device that captures the image data;
process the image data using at least one of: (a) a first pre-trained model; and (b) a set of one or more detection algorithms, to generate training data comprising a set of labels for the image data;
train a model using the set of labels for the image data, wherein the model is a neural network; and
following training, transfer the model for detection of the objects of interest;
wherein, for given image data received from one of the imaging devices, the computer program code is further configured to determine whether the given image data should be processed to generate the training data, wherein a determination is based on applying the given image data to a second model that has been trained to discriminate objects that are situated in confluent association with objects of interest or that are obscured by other structures.

* * * * *